(12) United States Patent
Tallet

(10) Patent No.: US 9,203,731 B2
(45) Date of Patent: Dec. 1, 2015

(54) MECHANISM TO IMPLEMENT A LAYER 2 GATEWAY

(75) Inventor: Francois Edouard Tallet, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 2060 days.

(21) Appl. No.: 11/297,027

(22) Filed: Dec. 7, 2005

(65) Prior Publication Data

US 2007/0076635 A1   Apr. 5, 2007

Related U.S. Application Data

(60) Provisional application No. 60/717,920, filed on Sep. 16, 2005.

(51) Int. Cl.
*H04L 12/701* (2013.01)
*H04L 12/753* (2013.01)
*H04L 12/46* (2006.01)

(52) U.S. Cl.
CPC ............. *H04L 45/00* (2013.01); *H04L 12/462* (2013.01); *H04L 45/48* (2013.01); *H04L 12/4641* (2013.01); *H04L 12/4679* (2013.01)

(58) Field of Classification Search
USPC ............. 370/254–256, 395.42; 709/235, 238
See application file for complete search history.

(56) References Cited

U.S. PATENT DOCUMENTS

| | | | |
|---|---|---|---|
| 5,265,092 A * | 11/1993 | Soloway et al. | 370/238 |
| 6,104,696 A * | 8/2000 | Kadambi et al. | 370/218 |
| 6,724,734 B1 * | 4/2004 | Shabtay et al. | 370/254 |
| 2002/0023170 A1* | 2/2002 | Seaman et al. | 709/235 |
| 2003/0065814 A1* | 4/2003 | Ishii | 709/239 |
| 2005/0071672 A1* | 3/2005 | Fung | 713/201 |

OTHER PUBLICATIONS

STP: Spanning Tree Protocol in IEEE 802.1D, retrieved using webarchive with a date of Feb. 24, 2004, http://web.archive.org/web/20040224050706/http://www.javvin.com/protocolSTP.html.*

* cited by examiner

*Primary Examiner* — Christopher Crutchfield
(74) *Attorney, Agent, or Firm* — Patterson & Sheridan, LLP

(57) ABSTRACT

A system in an operating system of a first network device for using Spanning Tree Protocol to determine a port of a device in a first administrative domain to transmit data between the first network device and a second administrative domain. The system determines each port in a device of the first administrative domain connected to a bridge for transmitting between the first network device and the second administrative domain. A priority of each these ports is determined by priority data. The port having a highest priority is then selected to transmit said data between said first network device and said second administrative domain.

17 Claims, 3 Drawing Sheets

MECHANISM TO IMPLEMENT A LAYER 2 GATEWAY

CROSS-REFERENCE TO RELATED APPLICATIONS

This application claims priority to U.S. Provisional Patent Application No. 60/717,920, filed Sep. 16, 2005 which is hereby incorporated by reference as if set forth herein.

FIELD OF THE INVENTION

This invention relates to a network device. More particularly, this invention relates to a system for determining a port of a network device used to transmit data between the network device and a second network device. Still more particularly, this invention relates to a system that uses that has uses a priority system to select a port in the Spanning Tree Protocol (STP).

PRIOR ART

In many network environments, such as a metro Ethernet environment, it is a problem to provide redundant layer 2 or physical connections between network devices in two different administrative domains without creating bridging loops. For purposes of this discussion, an administrative domain is a group of connected processing devices that provide a specified function in a network. A bridging loop is having two connections between two administrative domains where data transmitted over a first connection by one device in a first administrative domain is transmitted back to the device from a device in the second administrative domain over the second connection between the domains.

In the past, a Spanning Tree Protocol (STP) has been used to select one of the layer 2 connections or bridges between devices in two different administrative domains to transmit data between the domains and to determine redundant connections between the domains. One problem with using STP is that a device in the first administrative domain must run the STP over the devices in the second administrative domain. Thus, the stability of the connection for the first device depends on the devices in the second administrative domain. The dependence is a problem in that the first device relies on the device in the second administrative domain not dropping any Bridge Protocol Data Units (BPDUs). Secondly, the STP of the first device must be slower than the STP of the devices in the second administrative domain in order to prevent temporary loops at start up.

A further problem is that if the second administrative domain is partitioned, then more than one connection of the first device may end up forwarding data to devices in the second domain. This may cause a bridge loop when the partition is removed. The loop will not be eliminated until a hello-time for the STP of the first device is, performed.

A second method for determining a port of a first network device to transmit data between the first network device and a second network device is a hello protocol. In a hello protocol, each port in each device of a first administrative domain starts in a discarding state and the ports exchange hello messages in order to elect a port to transmit data between the devices in first and second administrative domain. The hello protocol is preferable to the STP because the devices in the first administrative domain do not have to rely on the second administrative domain to determine the connections between the domains. However, a hello protocol suffers from the same problem as STP in that if the second administrative domain is partitioned, a transient loop may occur when the partition is eliminated.

Thus, there is a need in the art for a system for determining a layer 2 connection for transmitting data between devices in a first administrative domain and a second administrative domain that effectively eliminates the transient loop problem in this scenario.

SUMMARY OF THE INVENTION

The above and other problems are solved and an advance in the art is made by a system for implementing a layer 2 gateway selection in accordance with this invention. One advantage of this system is that a user may configure the priority for the connections between devices to be used. A second advantage is that only the port of a device in a first administrative domain having the best priority is used to transmit data between devices in a first and second administrative domains at any given time. A third advantage of this system is that bridging loops are eliminated as only the port with the best priority is transmitting between the devices.

In a preferred embodiment of this invention, the system is implemented using STP. Thus, the port used to transmit data is selected by instance. Furthermore, the use of STP allows the system to use few device resources. Furthermore, the system is easy to implement by making minimal changes to the STP.

In accordance with this invention, a first device in a first administrative domain determines a port on any device in the first administrative domain for transmitting data between the first network device and devices in a second administrative domain in the following manner. The first device determines each port on devices in the first administrative network that has connection or bridge between the first network device and the second network device. The priority of each of the connected ports is then determined. The port having the highest priority is then selected as the port for transmitting data between the first device in a first administrative domain and devices in the second administrative domain. The priority for each port on each device in the first administrative domain connecting the first device and devices in a second administrative domain may be received as an input by a user to the device having the port or the first device.

In accordance with this invention, the selected port may be placed in a forwarding state for forwarding all data transmitted between the first device and devices in the second administrative domain. All other connected ports connecting the first device to the second administrative domain may then be placed in a blocking state in which data transmitted between the first device and device in the second administrative domain are not forwarded to the second domain by the ports.

The selected port then may transmit messages indicating that the connection between the selected port and a device in the second administrative domain is valid to a processing unit of the first device. In some embodiments, the message may be a Bridge Protocol Data Unit (BPDUs) when STP is being used to determine the connections. BPDUs from other ports connecting the first device to devices in the second administrative domain may be ignored by the first device in some embodiments.

BRIEF DESCRIPTION OF THE DRAWINGS

The above and other advantages and features of this invention are described in the following detailed description and shown in the following drawings.

DETAILED DESCRIPTION

Figure 1:
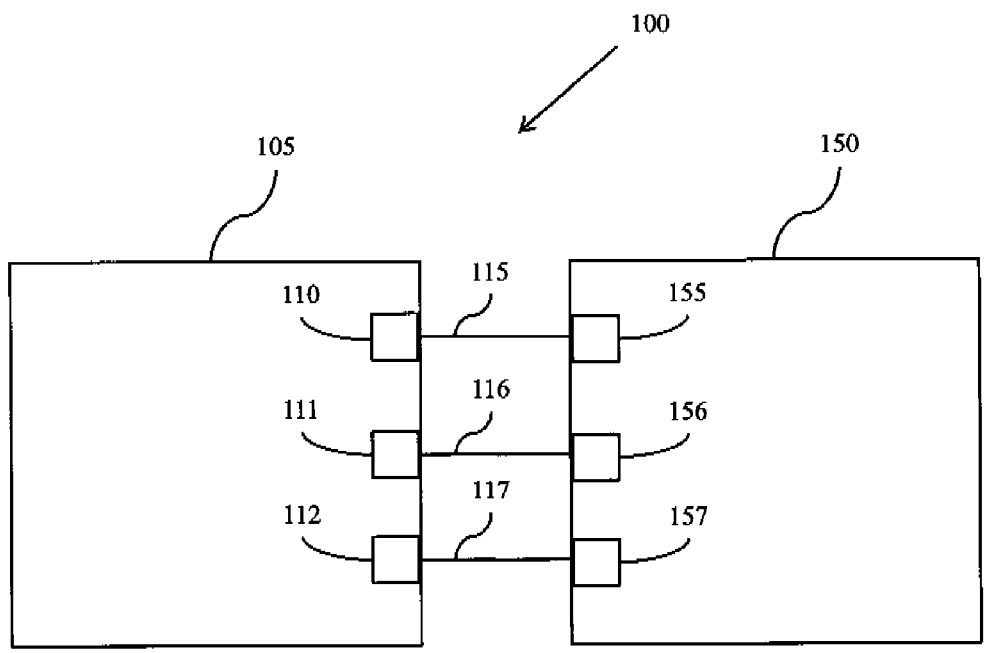
FIG. 1 illustrating connections between a first network device and a second network device.

This invention relates to providing a system that determines a layer 2 connection for transmitting data between a first and a second administrative domain. In the following disclosure, the same reference numeral is used for a component shown in different figures.

FIG. 1 illustrates a first network device 105 in a first administrative domain and a second device 150 in a second administrative domain that include a system for determining a layer two gateway in accordance with this invention. One skilled in the art will recognize that typically domains will include multiple devices. The exemplary embodiment uses one device in each network to simplify the description of a system in accordance with this invention.

FIG. 1 illustrates a first network device 105 that has several connections to a second network device 150 in a network 100. Network 100 may be an Ethernet or other type of network for connecting processing devices to transmit data between the devices. First network device 105 and second network device 150 are processing devices that may transmit data over a network. Some examples of such processing devices are servers, routers, and switches.

First network device 105 includes ports 110-112. Each port 110-112 of first network device 105 is connected by a path 115-117 to a port 155-157 of second network device 150. Each path 115-117 is a layer 2 or physical connection between first network device 105 and second network device 150.

Figure 2:
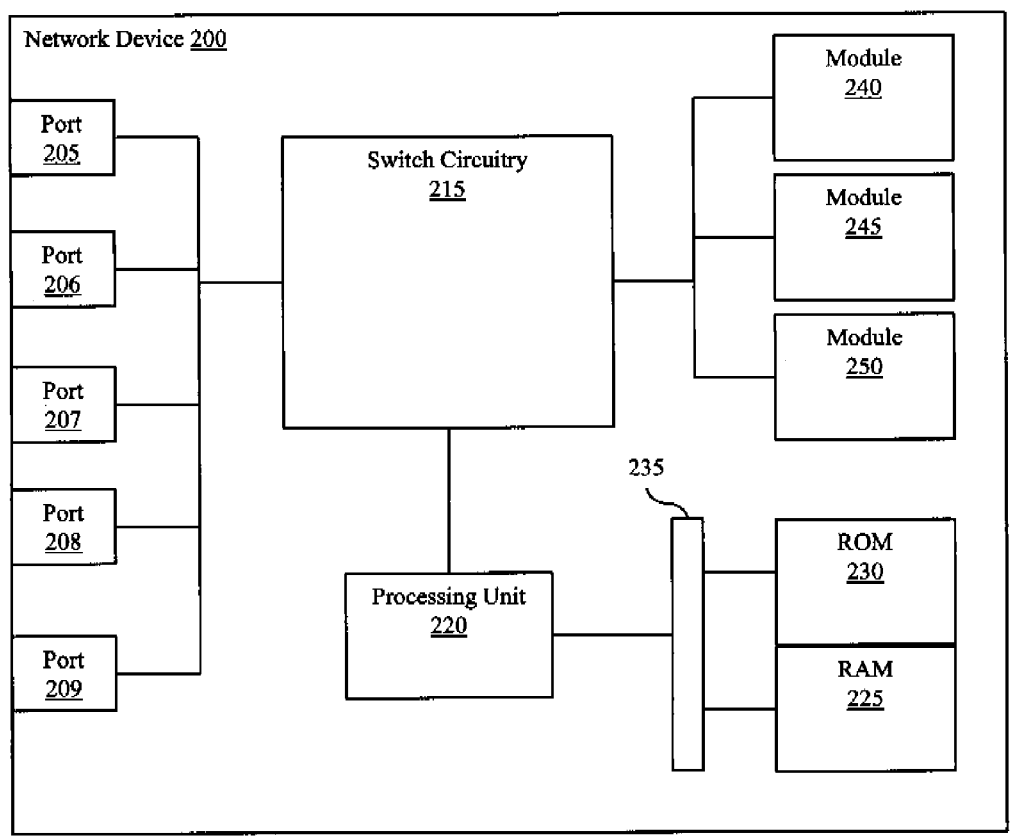
FIG. 2 illustrating a block diagram of components of a network device.

FIG. 2 illustrates an exemplary network device 200 that may be network device 105 and/or second network device 150 (FIG. 1). Network device 200 is a switching system that transmits digital data, in the form of packets between processing systems connected to a network. One skilled in the art will recognize that network device 200 may be a router, switch or any other processing system that receives and transmits digital data.

Network device 200 includes ports 205-209. Ports 205-209 connect network device 200 to other processing system in a network. The other processing systems that may be connected include computers, other routers or any other digital processing systems. One skilled in the art will further recognize that ports 205-209 are shown for exemplary purposes only and the exact number and configuration of the ports are left to one skilled in the art designing a specific network and/or specific network device.

Ports 205-209 are connected to switch circuitry 215. Switch circuitry 215 is circuitry that transmits received packets to the proper ports for delivery to the proper address. One skilled in the art will recognize that there are many different types of circuitry that may be used to transmit packets between proper ports and an explanation of the switching circuitry is not critical to this invention and is omitted for brevity.

Processing unit 220 is connected to switching circuitry 215. Processing unit 220 is a processor, microprocessor, or any combination of processors and microprocessors that execute instructions to perform applications for performing functions in network device 200. Processing unit 220 is also connected a volatile memory 225 and a non-volatile memory 230 via memory bus 235.

Volatile memory 225 is, for example, a Random Access Memory (RAM). A volatile memory stores instructions and data used by processing unit 220 to perform applications. One such application is a router operating system. The routing operating system is an applications which allow facilitates network device 200 performing other applications that provide the functions of network device 200. An example of a router operating system is Inter-network Operating System (IOS) designed by Cisco Systems Inc. One Skilled in the art will recognize that many different types of non-volatile memory including SRAM and DRAM may be used. Volatile memory is one example of a computer-readable medium that stores instructions for execution by a computer. Another example of a computer-readable medium is non-volatile memory.

Non-volatile memory 230 is a memory such as a Read Only Memory (ROM). Non-volatile memory 230 stores configuration and other vital information for router 100. One skilled in the art will recognize that there many different types of memory that may be used as a non-volatile memory.

Modules 240, 245, and 250 are connected to switching circuitry 215. Modules 240, 245, and 250 are device and/or software that prepare specific features in network device 200. An example of a module is a Voice Over Internet Protocol (VOIP) module for providing telephonic communications to processing devices connected to network device 200. One skilled in the art will recognize that the number of modules and the functions that each module provides may be determined by one skilled in the art designing a particular network device.

This invention relates to a system for selecting a port in a first network device for transmitting data between the first network device in a first administrative domain and a second network device in a second administrative domain. The system is executed by instructions that are stored as software, firmware or hardware in the device. In a preferred exemplary embodiment, this invention modifies the Spanning Tree Protocol (STP) executed by a processing unit in a first network device and ports of the first device to determine a port for transmitting data between the first device and a second network device.

Figure 3:
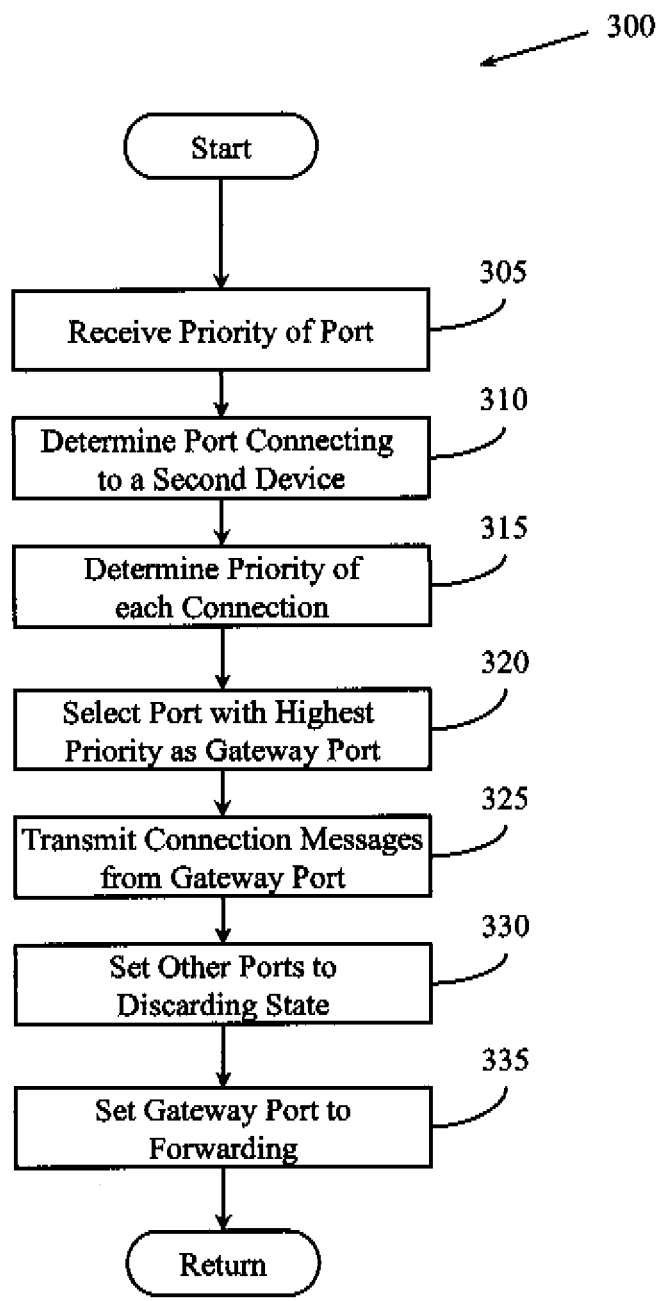
FIG. 3 illustrating a block diagram of a process for determining a connection for transmitting data between a first processing device and a second processing device in accordance with this invention.

FIG. 3 illustrates a flow diagram of an exemplary process for providing a system in accordance with this invention. Process 300 is executed by the processing unit of a first network device to determine a port of a device in the first administrative network for transmitting data between the first network device and devices in a second administrative domain. One skilled in the art will recognize that in some exemplary embodiments, process 300 may be a modified process for performing a STP algorithm.

Process 300 may begin in step 305 with the device receiving an input from a user that provides priority data for a port connecting the first device in the first administrative domain to a device in a second administrative domain. In step 305, the device may receive an input providing priority data for each of the ports that provide a connection between the first network device in the first administrative domain and a device in the second administrative domain. One skilled in the art will recognize that if there are more than one devices in the first administrative domain then priority data may be received for each port on each device that provides a connection between a device in the first domain and a device in the second domain. One skilled in the art will also recognize that the priority data may be set prior to connecting a device to a network.

In step 310, process 300 determines each of the ports of devices in the first administrative domain that provide a layer 2 connection between the first device in the first administrative domain and a device in the second administrative domain. In some exemplary embodiments, the determination is performed by a conventional STP algorithm. One skilled in the art will recognize that if devices other than the first device in the first administrative domain provide connections to devices in the second administrative domain, the first device must locate each port on each other device in the first administrative domain that connects the first administrative domain and the second administrative domain.

In step 315, process 300 determines the priority of each connection between the first device and the second administrative domain determined in step 310. Unlike, a conventional STP algorithm, process 300 uses priority data to determine the priority of each of the connections determined in step 310. In a preferred embodiment, the priority of the connection provided by each port is determined by the input priority data received for the connection. However, one skilled in the art will recognize that various algorithms may be used in which the input priority data or other data may by one of multiple parameters used to determine the priority of the port. In still other embodiments, there may be other types of priority data used.

In step 320, process 300 selects a port having the highest priority as the gateway port. The gateway port is the port over which data is transmitted between the first device and devices in the second administrative domain. In step 325, the selected gateway is set to transmit messages to the processing unit that the connection is still valid. The selected gateway ma also be configured to ignore incoming Bridge Protocol Data Units. In a preferred exemplary embodiment, this is performed by the gateway port continuously transmitting, Bridge Protocol Data Units (BPDUs) for the connection to the processing unit as long as the connection exists. In a conventional system using an STP algorithm, the BPDUs are transmitted including connection information. In some embodiments in accordance with this invention, the BPDUs transmitted by the selected gateway port may also include user input priority data.

In step 330, the other ports that provide connections to the second administrative domain are set to discard data transmitted between the first device and devices in the second administrative domain. The ports set to a discard state include those ports that do not provide a connection and each port that provide a redundant connection that may be activated if the connection of the selected port fails. This is different from a system performing STP in a conventional manner in which ports providing redundant connections may remain in a forwarding state. In step 335, the selected port is then set to a forwarding state to forward packets over the connection from the first device to a device in the second administrative domain. Process 300 then ends until the connection of the gateway port fail at which time process 300 may be repeated to determine a new gateway port.

The above is a description of an exemplary system for determining a port in a first network device for transmitting data between the first network device and a second network device in accordance with this invention. It is expected that ones skilled in the art can and will design alternative embodiments that infringe this invention as set forth in the claims below either literally or through the Doctrine of Equivalents.

What is claimed is:

1. A method, comprising:
setting priority values for one or more ports in a set of ports in a set of network devices, the network devices being associated with a first administrative domain, where members of the set of ports are associated with a priority value;
selecting a port from the set of ports, the selected port being connected to a bridge that is configured to transmit data between the first administrative domain and a second administrative domain, where the selected port is selected based, at least in part, on a priority value associated with the selected port;
preventing a transient loop by,
changing a state of the selected port to a forwarding state, where the forwarding state facilitates transmissions between the first administrative domain and the second administrative domain,
receiving, by the selected port, Bridge Protocol Data Units (BPDUs) while being connected to the bridge, and
ignoring incoming BPDUs from one or more members of the set of ports that are not selected.

2. The method of claim 1, where the set of ports in the set of network devices are layer 2 gateway ports; and
where the method comprises preventing transient loops in a connected network by the selected port, the connected network including the first administrative domain, the second administrative domain and connections between the first administrative domain and the second administrative domain.

3. The method of claim 1, where the BPDUs denote a valid bridge connection and include the priority value associated with the selected port.

4. The method of claim 1, including changing a state of the one or more members of the set of ports that are not selected to a discarding state.

5. A system, comprising:
an analysis logic implemented in one or more processors of one or more network devices to analyze a set of ports in a set of network devices, the network devices being associated with a first administrative domain, where a member of the set of ports is associated with a priority value;
a selection logic embodied in one or more processors of the one or more network devices to select a port from the set of ports, the selected port being connected to a bridge that is configured to transmit data between the first administrative domain and a second administrative domain, where the selected port is selected based, at least in part, on a priority value associated with the selected port;
a modification logic embodied in one or more processors of the one or more network devices to change a state of the selected port to a forwarding state, wherein a transient loop is prevented by,
changing the state of the selected port to the forwarding state,
receiving, by the selected port, Bridge Protocol Data Units (BPDUs) while being connected to the bridge, and
ignoring incoming BPDUs from one or more members of the set of ports that are not selected.

6. The system of claim 5, including priority logic configured to set priority values for one or more ports in the set of ports.

7. The system of claim 5, where the set of ports in the set of network devices are layer 2 gateway ports; and
the transient loop is prevented in a connected network including the selected port, the connected network including the first administrative domain, the second administrative domain and connections between the first administrative domain and the second administrative domain.

8. The system of claim 5, including a configuration logic to change a state of the one or more members of the set of ports that are not selected to a discarding state; and
where the BPDUs denote a valid bridge connection and include the priority value associated with the selected port.

9. A non-transitory computer-readable medium storing computer-executable instructions that when executed by a computer cause the computer to perform a method, the method comprising:
analyzing a set of ports in a set of network devices, the network devices being associated with a first administrative domain, where a member of the set of ports is associated with a priority value;
selecting a port from the set of ports, the selected port being connected to a bridge that is configured to transmit data between the first administrative domain and a second administrative domain, where the selected port is selected based, at least in part, on a priority value associated with the selected port;
preventing a transient loop by,
changing a state of the selected port to a forwarding state, where the forwarding state facilitates transmissions between the first administrative domain and the second administrative domain,
receiving, by the selected port, Bridge Protocol Data Units (BPDUs) while being connected to the bridge, and
ignoring incoming BPDUs from one or more members of the set of ports that are not selected.

10. The non-transitory computer-readable medium of claim 9, where the method includes setting priority values for one or more ports in the set of ports.

11. The non-transitory computer-readable medium of claim 9, where the set of ports in the set of network devices are layer 2 gateway ports; and
the transient loop is prevented in a connected network including the selected port, the connected network including the first administrative domain, the second administrative domain and connections between the first administrative domain and the second administrative domain.

12. The non-transitory computer-readable medium of claim 9, where the BPDUs denote a valid bridge connection and include the priority value associated with the selected port.

13. The non-transitory computer-readable medium of claim 9, where the method includes changing a state of one or more members of the set of ports that are not selected to a discarding state.

14. A system, comprising:
means for receiving priority values of a set of ports in a set of network devices, the network devices being associated with a first administrative domain;
means for selecting a port from the set of ports, the selected port being connected to a bridge that is configured to transmit data between the first administrative domain and a second administrative domain, where the selected port is selected based, at least in part, on the received priority value associated with the selected port;
means for preventing a transient loop by,
changing a state of the selected port to a forwarding state, where the forwarding state facilitates transmissions between the first administrative domain and the second administrative domain,
receiving, by the selected port, Bridge Protocol Data Units (BPDUs) while being connected to the bridge, and
ignoring incoming BPDUs from one or more members of the set of ports that are not selected.

15. The system of claim 14 where the set of ports in the set of network devices are layer 2 gateway ports; and
where the system comprises means for preventing the transient loop in a connected network including the selected port, the connected network including the first administrative domain, the second administrative domain and connections between the first administrative domain and the second administrative domain.

16. The system of claim 14, where the BPDUs denote a valid bridge connection and include the priority value associated with the selected port.

17. The system of claim 14, including means for changing a state of one or more members of the set of ports that are not selected to a discarding state.

* * * * *